US006564903B2

(12) United States Patent
Krajec

(10) Patent No.: US 6,564,903 B2
(45) Date of Patent: May 20, 2003

(54) COLLAPSABLE SAWHORSE BRACKET WITH INTERLEAVING LEGS

(76) Inventor: Russell S. Krajec, 2249 Weld County Rd. 46, Berthoud, CO (US) 80513

( * ) Notice: Subject to any disclaimer, the term of this patent is extended or adjusted under 35 U.S.C. 154(b) by 18 days.

(21) Appl. No.: 09/921,368

(22) Filed: Aug. 2, 2001

(65) Prior Publication Data

US 2002/0038741 A1 Apr. 4, 2002

Related U.S. Application Data

(60) Provisional application No. 60/225,233, filed on Aug. 14, 2000.

(51) Int. Cl.7 .............................................. F16M 11/00

(52) U.S. Cl. .................................... 182/153; 182/186.3

(58) Field of Search ................................ 182/151, 153, 182/181.1, 225.26, 224, 186.1, 186.2, 186.3, 186.5, 182.4, 182.5, 155, 154; 248/166, 439

(56) References Cited

U.S. PATENT DOCUMENTS

| | | | | | |
|---|---|---|---|---|---|
| 2,431,898 | A | | 12/1947 | Witken | 304/6 |
| 2,520,469 | A | | 8/1950 | Mowery | 311/84 |
| 2,573,740 | A | | 11/1951 | Spikings, Jr. | 304/5 |
| 3,198,286 | A | | 8/1965 | Wilson | 182/155 |
| 3,233,701 | A | | 2/1966 | Hentzi et al. | 182/155 |
| 3,282,379 | A | | 11/1966 | Jones | 182/155 |
| 3,618,704 | A | | 11/1971 | Smith, Sr. | 182/155 |
| 3,631,941 | A | | 1/1972 | Greenman Lane, Jr. | 182/155 |
| 3,682,272 | A | | 8/1972 | Secor | 182/155 |
| 3,700,072 | A | | 10/1972 | Lovett | 182/155 |
| 3,810,527 | A | * | 5/1974 | Kramer | 182/155 |
| 3,951,233 | A | | 4/1976 | Meyers | 182/155 |
| 3,978,943 | A | | 9/1976 | Greenman et al. | 182/155 |
| 4,030,565 | A | * | 6/1977 | Chaput | 182/151 |
| 4,046,221 | A | | 9/1977 | Edenfield | 182/155 |
| 4,298,094 | A | | 11/1981 | Strong | 182/155 |
| 4,325,463 | A | * | 4/1982 | Taylor | 182/155 |
| 4,375,245 | A | * | 3/1983 | Schill | 182/155 |
| 4,403,678 | A | * | 9/1983 | Zieg | 182/153 |
| 4,605,099 | A | * | 8/1986 | Crum et al. | 182/155 |
| 4,640,386 | A | * | 2/1987 | Hall | 182/155 |
| 4,804,064 | A | * | 2/1989 | Coultrup et al. | 182/155 |
| 4,926,966 | A | * | 5/1990 | Boudreau | 182/155 |
| 4,967,877 | A | | 11/1990 | Wallman et al. | 182/155 |
| D328,355 | S | | 7/1992 | Librach | D25/67 |
| 5,439,073 | A | | 8/1995 | Johnson | 182/153 |
| 5,626,205 | A | * | 5/1997 | Martin | 182/153 |
| 5,779,003 | A | | 7/1998 | Carty | 182/225 |
| 5,813,495 | A | | 9/1998 | Smith | 182/155 |
| 6,161,807 | A | * | 12/2000 | Steiner et al. | 182/181.1 X |

* cited by examiner

*Primary Examiner*—Daniel P. Stodola
*Assistant Examiner*—Hugh B. Thompson
(74) *Attorney, Agent, or Firm*—Russell S. Krajec

(57) ABSTRACT

A sawhorse is constructed with brackets allowing the legs of the sawhorse to fold into a compact unit by having the legs interleave when folded. The legs pivot about a plane that is canted to allow each leg to rotate without interfering with any other leg. The length of the legs are not restricted in any fashion. The legs may also be locked in both the extended, or service position as well as the closed position. The bracket may be constructed of as few as two unique parts, and a pair may be nested together for compact shipping, storage, and display on a store shelf.

6 Claims, 6 Drawing Sheets

COLLAPSABLE SAWHORSE BRACKET WITH INTERLEAVING LEGS

CROSS REFERENCE TO RELATED APPLICATION

This application claims benefit of U.S. Provisional Application No. 60/225,233 filed Aug. 14, 2000 by Russell S. Krajec of Berthoud, Colo., and hereby incorporates the application by reference.

BACKGROUND OF THE INVENTION a. Field of the Invention

The present invention pertains generally to sawhorses, trestles, and other stands for use as temporary worksurfaces and specifically to brackets for the construction of sawhorses wherein the legs are allowed to fold.

b. Description of the Background

Carpenters, painters, and other individuals who need basic supporting surface that is raised from the floor have used sawhorses as an everyday tool. Scaffolding may be placed on the sawhorses to support workmen as they work, or workpieces may be placed directly on the sawhorses.

Many attempts have been made to create a useful sawhorse, but few inventions have met with much commercial success. Usually, the mechanisms contain many parts, including cross braces and the like, which add to the cost and make the devices less successful in the commercial arena.

Several sawhorses incorporate multiple motions for the legs to rotate, ref U.S. Pat. Nos. 2,431,898, 3,233,701, 3,282,379, 3,631,941, 3,978,943, 4,046,221, 5,439,073, 5,779,003, and 5,813,495. Each of these, in their own way, requires the user to move the legs in two prescribed motions to fold or unfold the legs. The dual motion of the legs adds complexity and cost to the sawhorse. The dual motion has the additional disadvantage of not being intuitive, thus limiting the appeal of the consumer who is likely to purchase the product.

As has been taught in U.S. Pat. No. 3,631,941, it is important for the user of the sawhorse to be able to set the height and size of the sawhorse for the job's purpose. It is advantageous for the user to select the leg length and thus overall height of the sawhorse without having restriction as to the length. All of the previously referenced patents, as well as U.S. Pat. Nos. 2,520,469, 2,573,740, 3,198,286, 3,618,704 and 3,951,233 do not allow for the legs to be appreciably longer than the main beam of the sawhorse.

Another useful feature for commercial viability is the compactness of the shipping configuration of the sawhorse bracket. Prior art, including U.S. Pat. Nos. 3,978,943 and 5,779,003, do not have this advantage.

The utility of the folding sawhorse depends on the usefulness of the sawhorse in both its folded and unfolded positions. In the folded position, the sawhorse legs should be locked firmly in place so that they do not open when being transported. The assembled sawhorse when folded should be transportable without having to keep the legs from falling open during transport. This allows the tradesman to hold the sawhorse in any position during transport or storage. U.S. Pat. Nos. 2,520,469, 2,573,470, 3,631,941, 3,978,943, 5,779,003, 5,813,495, and D328,355 all teach designs where the legs are locked in the open position but not the folded position.

In the open position, it is also critical for the legs to be firmly and securely braced, as the tradesman may lift the sawhorse by the main beam to reposition it several times during his course of using the sawhorse. A leg that flops around when the sawhorse is picked up is quite distracting and interferes with the tradesman's job. U.S. Pat. No. 3,978,943 teaches a method where the legs are secured in the open position by the friction of a toothed metal bracket engaging the wooden main beam of the sawhorse. This method would not be adequate for repeated uses, as the wooden beam would become marked by the repeated engagements and would no longer hold the leg securely when the main beam was lifted.

Commercial success is also dependent on the tradesman's ability to construct the sawhorse quickly and efficiently without having to make complicated compound angle cuts of lumber. U.S. Pat. No. 3,682,272 teaches a design for dually canted pivoting legs, but the construction relies on compound angled cuts.

A simple, intuitive locking mechanism is essential for commercial success of the invention. Tightening fasteners, as in U.S. Pat. No. 3,682,272 is not as desirable as a single press-to-release locking mechanism of the present invention.

For the carpentry trade, the sawhorse is preferred to have the main beam oriented with the smallest dimension of the beam is on the top and contacts the work which rests on the sawhorse. The carpenter also requires that the main beam of the sawhorse is made of wood and does not damage the blade of a saw. This orientation of the main beam also is the orientation that offers the most strength to the sawhorse. U.S. Pat. No. 2,431,898 teaches a device which has metal bracketry which could be damaged by a saw blade. U.S. Pat. Nos. 2,520,469, 2,573,740, 3,198,286, 3,233,701, 3,282,379, 3,631,941, 3,682,272, 3,700,072, 3,951,233, 4,046,221, 4,298,094, 4,967,877, 5,779,003, and 5,813,495 all teach designs which are less desirable in these regards due to the positioning of the main beam.

It would therefore be valuable to provide a bracket to assist the tradesman in building a sawhorse using conventional lumber that allows the legs to fold into a compact unit for transport. Further, the sawhorse bracket should be simple and contain as few a number of parts as possible. The brackets should create a sawhorse that has a simple, intuitive motion for extending and retracting the legs of the sawhorse. The brackets should allow the user to construct a sawhorse of virtually any height and width, with the minimum of restriction. The legs of the sawhorse should lock in place in both the open and closed positions so that the sawhorse is easily repositioned. Further, the bracket should be able to be packaged in a small form for efficient use of shipping and shelf space. The sawhorse should have the main beam oriented with a short side of the main beam at the top to minimize interference with the carpenter's saw or other tool.

SUMMARY OF THE INVENTION

The present invention overcomes the disadvantages and limitations of the prior art by providing a set of sawhorse brackets for building a sawhorse of common dimensional lumber. Further, the brackets create a sawhorse that the legs are foldable and interleave when folded. The legs of the sawhorse rotate in a plane that is doubly canted: first to allow the legs to splay when extended and a slight cant in the plane of the main beam such that the legs do not interfere with each other when folded.

The bracket incorporates two hinge points: a first hinge point where the legs rotate, and a second hinge point where the bracket grips the main beam of the sawhorse. The second hinge point allows the bracket to fold and nest with another bracket so that the pair may be packaged in a box. Further, when the brackets are out the package, the pair will stay together as a unit, for easy handling when the sawhorse is disassembled.

The pivot action of the legs is locked in both the open and closed position using the same mechanism. The locking mechanism is intuitive to a consumer and easy to operate.

The bracket is constructed of two unique parts, four of each are required to make a single sawhorse. The locking mechanism may be constructed of a third part or may be incorporated into one of the other main parts.

The present invention may therefore comprise a bracket for the attachment of a pair of folding legs to a sawhorse horizontal body comprising: a frame for receiving a longitudinal sawhorse body; two leg attachments for each receiving a sawhorse leg, the attachments being pivotally attached to the frame and each being adapted to swing from an extended, service position, to a folded position, the axis of rotation for the first leg attachment being such that the leg forms an acute angle diverging from the axis of the body in the horizontal plane when in the folded position and the second leg forms an acute angle converging to the axis of the body in the horizontal plane when in the folded position.

The present invention may therefore further comprise a bracket for the attachment of a pair of folding legs to a sawhorse horizontal body comprising: a frame comprising two surfaces diverging downward in the vertical plane and canted by an angle in the horizontal plane to a plane normal to the longitudinal axis of the sawhorse horizontal body, the frame adapted to attach to the sawhorse horizontal body, and a leg receiver mounted to each of the diverging surfaces, pivotally mounted and adapted to swing from an extended, service position to a folded position, each leg receiver adapted to receive a sawhorse leg.

The present invention may therefore further comprise a bracket for the attachment of a pair of folding legs to a sawhorse horizontal body comprising: a frame assembly comprised of two frames pivotally attached and adapted to clamp onto the sawhorse main body, each frame comprising a surface diverging downward in the vertical plane and canted by an angle in the horizontal plane to a plane normal to the longitudinal axis of the sawhorse horizontal body, and a leg receiver mounted to the diverging surface, pivotally mounted and adapted to swing from an extended, service position to a folded position, each leg receiver adapted to receive a sawhorse leg.

The present invention may therefore further comprise a foldable sawhorse comprising: a longitudinally extending sawhorse body; two brackets mounted onto the body; two legs pivotally mounted to each of the brackets and adapted to swing from extended, service positions, and positions folded underneath the body; the axis of the pivot mounts being adapted so that the legs clear and lie alongside and at an acute angle relative to one another when in the folded positions.

The advantages of the present invention are the simplicity of the bracket design, which comprises two or three unique parts, and the simplicity of the locking mechanism, both of which result in low per unit cost. The design is intuitive and easily understood by consumers. The bracket uses conventional lumber and does not require any special mitered cuts to produce a fully functional sawhorse. Further, the length of the sawhorse legs is unrestricted, and a sawhorse of any height can be constructed with the inventive brackets. A sawhorse produced with the brackets is sturdy and the legs rigidly lock in both the open and closed positions. The brackets nest into each other so that the packaging for a pair of brackets is simple and space-efficient.

DETAILED DESCRIPTION OF THE INVENTION

Figure 1:
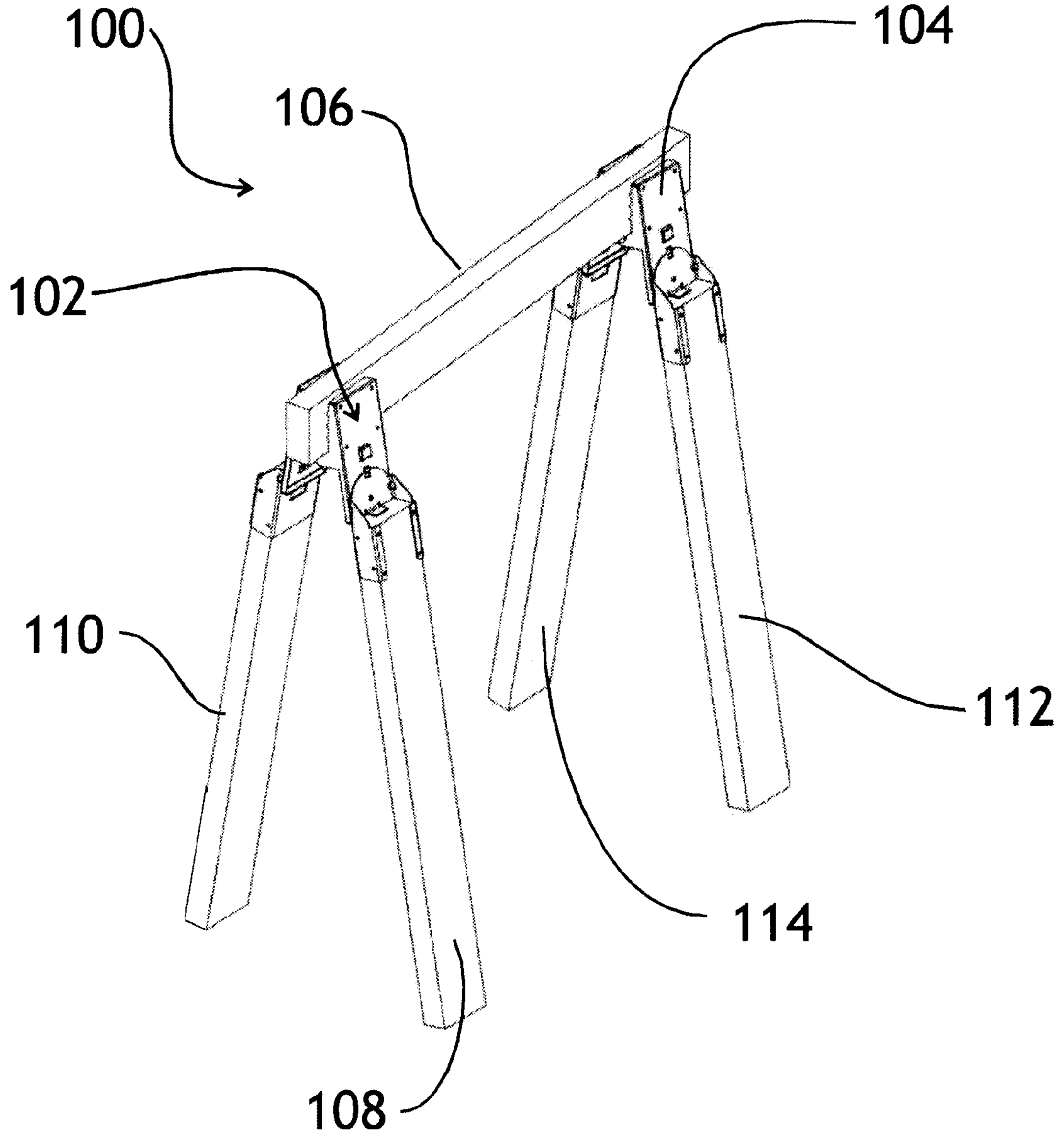
FIG. 1 is an illustration of a perspective view of an embodiment of the inventive brackets made into a sawhorse wherein the sawhorse is shown with the legs in the open position.

FIG. 1 illustrates a perspective view of an embodiment of the inventive brackets fashioned into a sawhorse 100. A first bracket 102 and a second bracket 104 are connected to the sawhorse main beam 106. Legs 108 and 110 attach to bracket 102 and legs 112 and 114 attach to bracket 104. The sawhorse 100 is shown in the extended, or service position. From this illustration, the sawhorse resembles a conventional sawhorse in form and function.

Figure 2:
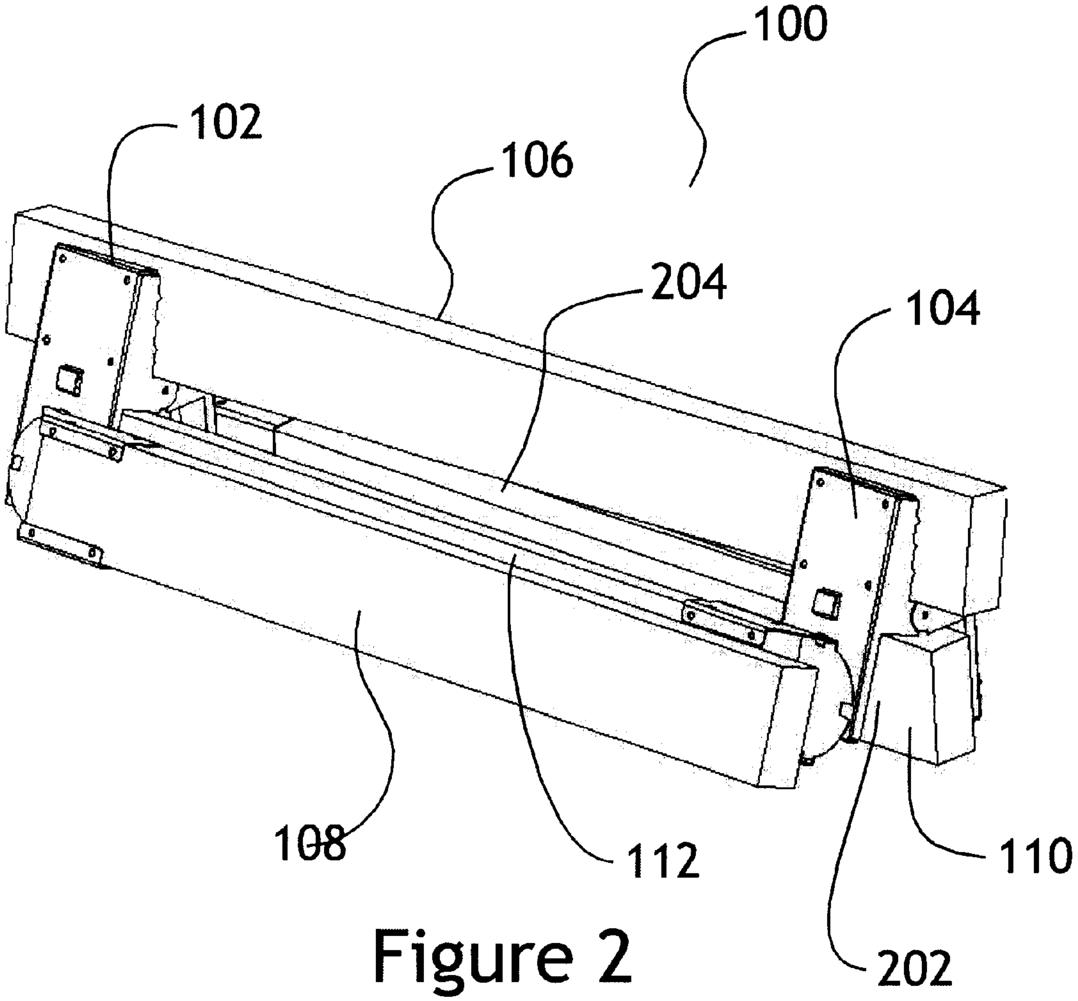
FIG. 2 is an illustration of a perspective view of an embodiment of the inventive brackets made into a sawhorse wherein the sawhorse is shown with the legs in the closed position.

FIG. 2 illustrates a perspective view of an embodiment of the inventive brackets made into a sawhorse 100 wherein sawhorse 100 is shown with the legs in the closed position. First bracket 102 and second bracket 104 are connected to the sawhorse main beam 106. Legs 108 and 110 attach to bracket 102. Leg 112 is attached to bracket 104. Leg 114 is not visible in this view.

Leg 108 does not interfere with leg 112 when the legs are folded. Leg 112 folds in-between leg 108 and leg 110 and does not touch either leg. Further, leg 110 extends through an open area underneath bracket 104. Each leg is slightly canted towards or away from the vertical plane of the horizontal main beam 106, this canted angle allows the legs 108, 110, 112, and 114 to interleave when folded without touching.

The legs lie near each other, but do not touch. Since the legs do not touch, when the legs of the sawhorse 100 are changed from the extended or service position to the closed position, any leg can be operated in any order.

There is no limitation on the length of the legs for the construction of a working sawhorse. Leg 110 extends through an open portion 202 of bracket 104, which does not interfere with leg 110; therefore, leg 110 may extend to any length whatsoever. Further, there is no limitation on the length of the main beam 106 in the present embodiment.

As also illustrated in FIG. 2, the folded sawhorse constructed with an embodiment of the present invention is very compact when folded. The legs fold such that they are in the same plane as the main beam 106 and as such present a very compact profile. Further, a gap 204 below main beam 106 makes for an easy handhold.

Figure 3:
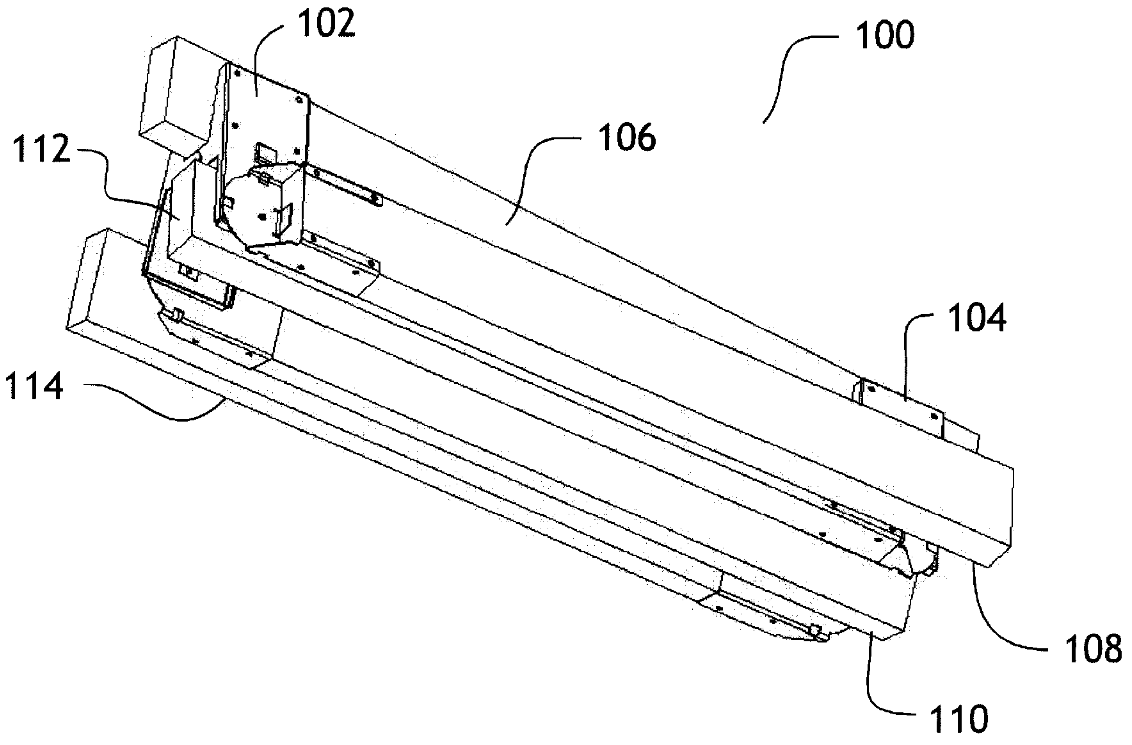
FIG. 3 is an illustration of a second perspective view of an embodiment of the inventive brackets made into a sawhorse wherein the sawhorse is shown with the legs in the closed position.

FIG. 3 is an illustration of a second perspective view of an embodiment of the inventive brackets made into a sawhorse 100 wherein sawhorse 100 is shown with the legs in the closed position. First bracket 102 and second bracket 104 are connected to the sawhorse main beam 106. Legs 108 and 110 attach to bracket 102. Legs 112 and 114 are attached to bracket 104.

Figure 4:
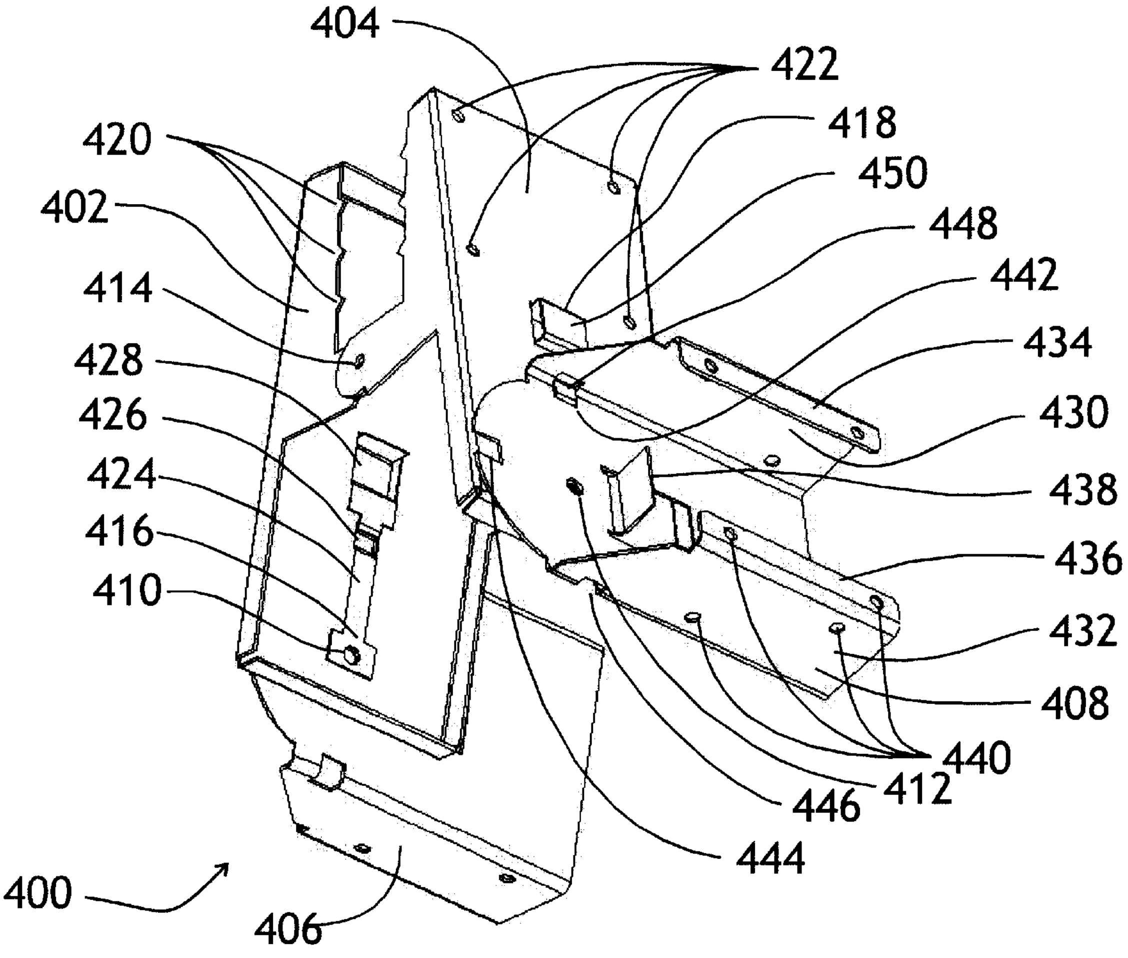
FIG. 4 is an illustration of a perspective view of an embodiment of the inventive bracket.

FIG. 4 is an illustration of an embodiment 400 of the present invention. First frame 402 is attached to second frame 404. First leg bracket 406 and second leg bracket 408 are attached to frames 402 and 404 by rivets 410 and 412, respectively. First frame 402 is assembled to second frame 404 by a rivet 414. A second rivet along substantially the same axis as rivet 414 is hidden from view. Locking tab 416 is attached to the assembly by rivet 410. Locking tab 418 is attached by rivet 412.

Embodiment 400 is designed to be a cut length of conventional 2×4 or 2×6 standard size lumber for the horizontal main body. Further, embodiment 400 is designed accept legs constructed of cut lengths of conventional 2×4 lumber.

Frame 402 comprises teeth 420 that engage the main beam of the sawhorse on assembly. During assembly, the first frame 402 and second frame 404 are rotated about the axis of rivet 414 such that the teeth 420 are opened. When the main beam is presented, the frames 402 and 404 are then rotated about the axis of rivet 414 so that the teeth 420 engage the main beam. Screws or nails may be used in holes 422 to allow fasteners to be used to attach the frames 402 and 404 to the main beam.

Embodiment 400 is constructed from sheet metal, but other embodiments are contemplated being made from metal or plastic extrusion, machined metal or plastic parts, plastic molded parts, or other materials and processes while still keeping the two piece frame design similar to components 402 and 404.

Other embodiments of the present invention may not have a frame portion comprised of two hinged components 402 and 404 and may be comprised of a single piece. The frame components may be a unitized sheet metal, extruded metal or plastic, molded plastic, or other unitized design. In a unitized design, the frame members may incorporate other methods of attaching to the main beam. These methods may include portions of the frame that are hammered into the main beam, snap features that grip the main beam, or other methods. Those skilled in the art may find different methods of construction and attachment while still maintaining within the scope of the present invention.

Locking tab 416 comprises a flexible area 424, a locking protrusion 426, and a push tab 428. The protrusion 426 fits through a hole in frame 402 and into a second hole in the leg bracket 406. The leg bracket 406 is held in place by the protrusion 426 engaging the hole in the leg bracket. For the protrusion 426 to be disengaged from the leg bracket 406, the push tab 428 is pressed by the user until the protrusion 426 is disengaged.

Locking tab 416 may be made of metal or plastic, but it is designed to be flexible at least in the area 424. Locking tab may further be constructed of more than one part. In the present embodiment of the invention, locking tab 416 is shown as constructed of one piece of sheet metal or sheet plastic. However, protrusion 426 and push tab 428 may either or both be second parts that are attached to the locking tab 416. Further, the locking tab 416 may comprise a feature that is integral to the frame 402 and is formed out of the base material of frame 402. The locking tab is generally designed so that the deformation of the flexible area 424 is completely elastic and does not undergo any permanent deformation during normal use.

Locking tab 416 may be formed with a curve in the area 424 which would bias the protrusion 426 outward and cause the locking tab 416 to be preloaded. Further, the protrusion 426 may be tapered such that protrusion 426 wedges into the frame 402 and leg attachment 406. Such a wedge would, when accompanied with a biasing curve in the area 424, would serve to tighten itself while the sawhorse is being handled.

Locking tab 416 may be attached to frame 402 by many different methods. A rivet through hole 410 may be inserted and formed. The leg attachment 406 may have some material formed up in the area of hole 410 which will be cinched down over the frame 402 and locking tab 416 to affect a joint. Other methods may include spot welding, other types of fasteners, etc.

The locking tab 416 may be attached to the outside of leg attachment 406. In such a situation, pulling the tab away from frame 402 rather than pressing the tab inwards may operate the locking tab 416. Such a tab may be formed as an integral feature of leg attachment 406. Those skilled in the art may be able to create other locking mechanisms for the present invention without deviating from the scope and intent of the present invention.

The invention contains a locking mechanism for each leg assembly that permits locking a leg in an open and closed position, unlocking a leg for rotation to the other position and then locking that leg into that position. The locking mechanism locks the legs in both positions of the legs. This feature ensures that the sawhorse will be sturdy when open and easy to handle when closed. The locking mechanism is intuitive and easily described for commercial sale.

The locking tab 416 may also include a formed rib or other stiffening feature to stiffen the said area between the protrusion and the button 428. Further, the button 428 may include a tab, lip, or other feature that protrudes from the outermost surface of button 428 and over the outermost surface of frame 402 at such a distance as to limit the distance that a user can depress the locking mechanism. This said tab would serve as a protection from deforming the locking tab 416 from permanent deformation by over bending the tab 416 past its elastic limit.

The aperture through frame 402 through which the protrusion 426 extends is designed to be the same size as the aperture of leg attachment 404 and the protrusion 426 to be slightly smaller than either of the apertures through the frame 402 or leg attachment 404. The size difference between the apertures and protrusion 426 is selected so that any manufacturing variances, such as sheet metal burrs or differences in tooling, would prevent the protrusion from fully engaging through both apertures.

Leg bracket 408 comprises two walls 430 and 432, each of which has attached tabs 434 and 436, respectively. The walls 430 and 432 and tabs 434 and 436 are sized so that a conventional piece of lumber can fit within the leg bracket 408. Tab 438 serves to limit the distance that a sawhorse leg may be placed inside the leg bracket 408. Screws or other fasteners may be used in holes such as 440 to fasten the leg inside the leg bracket 408. Other embodiments of the present invention may incorporate other fastening mechanisms, such as a set of teeth adapted to be hammered into the leg, or other locking mechanisms to attach a leg to bracket 408. Those skilled in the art may be able to expand the methods of holding a leg into leg bracket 408 without deviating from the scope and intent of the present invention.

The leg bracket 408 has three cut outs 442, 444, and 446. Second locking tab 418 has a protrusion 448 and push tab 450. The locking mechanism locks the position of the leg bracket 408 in one of three positions. In the position that is illustrated, the locking tab protrusion 448 extends through the cut out 442. When the push tab 450 is depressed, the locking tab protrusion 448 will disengage cut out 442 and allow the leg bracket 408 to rotate. The user may then rotate the leg bracket 408 in a clockwise direction. The user may optionally release the push tab 450 and continue to rotate the leg bracket 408. The locking tab 418 would then apply some spring force against the locking tab protrusion 448 and the leg bracket 408. As the leg bracket 408 attains a position where the leg of the sawhorse would be fully extended, the cut out 444 would allow the locking tab protrusion 448 to extend through cut out 444 by the spring force and secure the leg bracket 408 in place. The leg bracket 408 may also be unlocked and rotated another ninety degrees counter clockwise so that the leg bracket 408 is positioned 180 degrees from the positioned illustrated. This feature is only due to the symmetrical design of the sheet metal components used to create this particular embodiment and is not a necessary feature of all embodiments of the present invention.

The embodiment 400 is constructed of three unique formed sheet metal parts. While the invention does not preclude the use of other materials or designs, the simplicity of the preferred embodiment has the distinct commercial appeal of minimizing the tooling costs associated with the manufacturing the invention.

Figure 5:
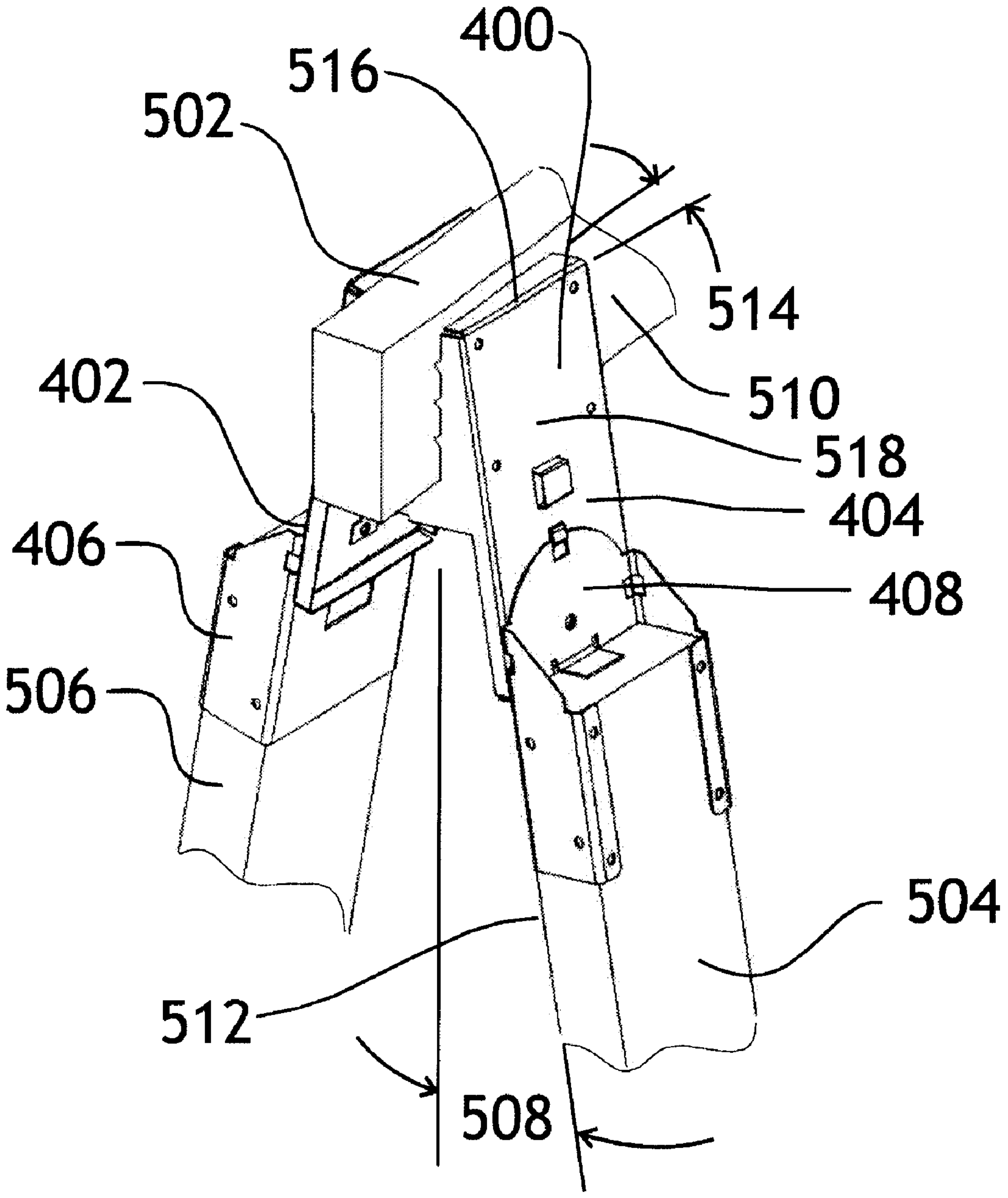
FIG. 5 is an illustration of a detailed perspective view of an embodiment of the inventive bracket shown with the main beam and legs attached.

FIG. 5 illustrates a close-up view of a embodiment 400 of the invention attached to a sawhorse main beam 502, a first leg 504, and a second leg 506. The plane of rotation for leg bracket 408 can be defined by two angles. Angle 508 defines an angle between face 510 of the main beam 502 and edge 512 of the leg 504 in the vertical plane. Angle 508 defines the splay of the legs, or the angle of the opening of the legs in the vertical plane. Typically, this angle may be 5 to 15 degrees, although the angle may be smaller or larger depending on the application.

Angle 514 defines the angle between the face 510 of main beam 502 and the edge 516 of the frame in the horizontal plane. Angle 514 is the twist or offsetting angle that allows the legs to interleave when folded. Angle 514 may be between 1 and 5 degrees, although other angles may be used depending on the application and design intent of the bracket designer. The spacing between the two brackets that comprise a sawhorse is affected by the angle 514. For embodiment 100 in FIGS. 2 and 3, the minimum and maximum spacing between brackets 102 and 104 is determined by angle 514. A larger angle 514 means that the spacing between brackets 102 and 104 would be shorter and if angle 514 were smaller.

Angle 514 allows one leg to fold convergent to the axis of the main beam 502 and the opposite leg to fold divergent to the main beam 502. This is the manner by which the four legs of the sawhorse are able to interleave without interfering with each other.

The relationship of the angles 508 and 514 are the method by which the legs of the sawhorse constructed with the inventive brackets are able to open and close in one motion. When the legs are open, the legs are splayed so that the sawhorse is rigid and stable. When the legs rotate in the plane defined by the angles 508 and 514, the leg moves in a plane that does not interfere with any other leg or member.

A typical assembly sequence to construct a sawhorse using the inventive bracket would be to cut legs 504 and 506 to length and assemble legs 504 and 506 into bracket 400. The legs 504 and 506 would then be fastened into leg assemblies 408 and 406 respectively by fasteners. The leg brackets 406 and 408 would be positioned as illustrated in FIG. 5. Main beam 502 would be positioned between the frame members 402 and 404. The legs 506 and 508 would then be spread so that the frame members 402 and 404 grip the main beam 502. Fasteners would then secure the frames 402 and 404 to main beam 502. The process would be repeated for the second bracket and set of legs. Other sequences could be used to assemble a sawhorse using the inventive brackets without deviating from the scope of the invention.

The present embodiment of the invention uses conventional dimensional lumber that requires no special angled cuts to assemble. It is foreseeable that the ends of the legs may be cut at an angle so that the ends of the legs rest flat on the floor. This, however, is not a requirement for the performance of the invention.

The invention provides an arrangement whereby of the two legs at each end, one pivots along a plane that is convergent to the axis of the main beam and the other leg pivots along a plane that is divergent to the said beam, permitting the interleaving of the legs in the closed position in such a manner as to not interfere with the other legs of the assembly. In the specific example given, the plane of rotation, plane 518, is divergent from the main axis of main beam 502 by angle 514 such that leg 504, diverges from the main beam 502. Leg 506 rotates along a plane which is canted the same amount in a convergent manner, allowing the leg 506 to fold in-between the opposite legs attached to a bracket identical to embodiment 400. In the folded position, all of the legs can be locked in the folded position without touching or interfering with any other legs.

Figure 6:
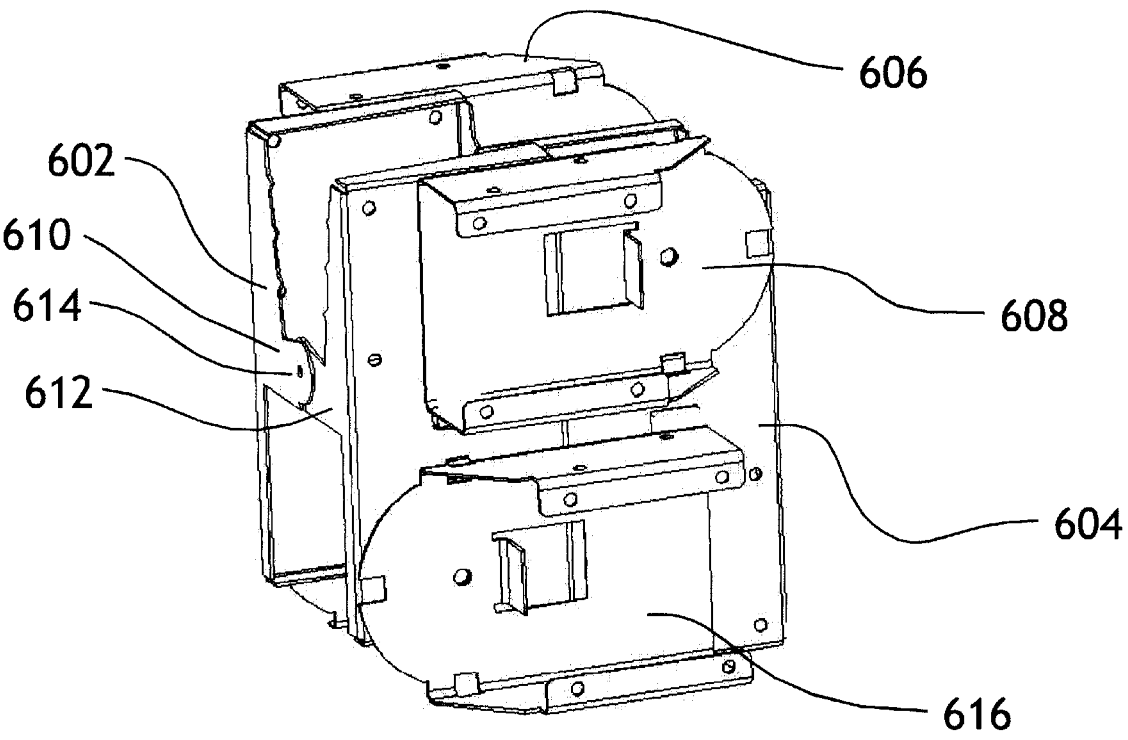
FIG. 6 is an illustration of a perspective view of an embodiment of the inventive brackets shown nested in a storage or shipping position.

FIG. 6 illustrates an embodiment whereby two brackets 602 and 604 can be pivotally opened and nested into each other for shipping or storage. The leg attachments 606 and 608 are first positioned in the folded position for each bracket. Frames 610 and 612, of each bracket assembly 602 and 604, are rotated about axis 614 with respect to one another so that the outer faces of frames 610 and 612 are essentially parallel. Bracket assembly 604 is rotated so that the leg attachments 606 and 608 are towards the top. The two bracket assemblies 602 and 604 are then mated together so that the faces of frames 610 and 612 come in contact with the same faces of the opposite bracket, and the frames of one bracket assembly fit between the leg attachments of the opposite bracket assembly. In the nested position, the inside face of the leg attachment 608 would be in direct contact with the outer face of the frame 612. The riveted joints 614 in the embodiment are selected such that the frames 610 and 612 may be rotated about the joint 614 by hand, but with enough friction so that the frames 610 and 612 stay in their positions without moving. It may be preferred to mate the two bracket assemblies with the outer faces of frames 610 and 612 angled slightly so that the leg attachments 606 and 608 are further apart than when the outer faces of frames 610 and 612 are parallel, then rotate the frames 610 and 612 about axis 614 after the said inner faces of the frames 610 and 612 of the opposite brackets are in contact with each other. The two brackets may be held with the friction in the riveted joints 614 or there may be mechanical engagement, such as a small tab in the leg attachment 608 that engages a hole in frame 612 in the opposite assembly.

The assembly illustrated in FIG. 6 is a very compact form. A simple printed cardboard sleeve may be used to contain the products during shipping and for the advertisement and display of the product on the store shelves. Further, a sawhorse may be disassembled at a jobsite and the tradesman may reassemble the brackets into their nested form for storage and transportation to the next jobsite.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A bracket assembly for the attachment of two pair of folding legs to a sawhorse horizontal body comprising:

two brackets, each of said brackets comprising a frame for receiving a respective end of said sawhorse body, two leg attachments for each receiving a respective pair of sawhorse legs, said attachments being pivotally attached to said frame and each being adapted to swing from an extended, service position, to a folded position in a horizontal plane substantially parallel to a longitudinal axis of said body, a single axis of rotation for one of said leg attachments being such that a first of said pair of legs forms an acute angle angled inward towards said axis of said body in said horizontal plane when in said folded position and a second of said pair of legs forms an acute angle angled outward from said axis of said body in said horizontal plane when in said folded position, so as to permit the respective pairs of legs to interleave when in the folded position when said brackets are adapted to be attached to the respective ends of said sawhorse body.

2. The bracket assembly of claim 1 wherein a locking mechanism for each of said leg attachments is adapted to secure said leg attachments in said extended position.

3. The bracket assembly of claim 2 wherein said locking mechanism is adapted to secure said leg attachments in said folded position.

4. The bracket assembly of claim 1 wherein said sawhorse longitudinal body is comprised of common sized lumber.

5. The bracket assembly of claim 1 wherein at least one of said sawhorse legs is comprised of common sized lumber.

6. A sawhorse assembly comprising:

a sawhorse body comprised of a horizontal beam, two pairs of legs, and two brackets, each of said brackets comprising a frame for receiving said sawhorse body, two leg attachments for each receiving a respective end of one of said pairs of said legs, said attachments being pivotally attached to said frame and each being adapted to swing from an extended, service position, to a folded position in a horizontal plane substantially parallel to a longitudinal axis of said body, a single axis of rotation for one of said leg attachments being such that a first of said pair of said legs forms an acute angle angled inward towards said axis of said body in said horizontal plane when in said folded position and a second of said pair of legs forms an acute angle angled outward from said axis of said body in said horizontal plane when in said folded position, so as to permit the respective pairs of legs to interleave when in the folded position and when said brackets are attached to the respective ends of said sawhorse body.

* * * * *